(12) United States Patent
Tang et al.

(10) Patent No.: US 8,339,543 B2
(45) Date of Patent: Dec. 25, 2012

(54) PLASMONIC DEVICE TUNED USING ELASTIC AND REFRACTIVE MODULATION MECHANISMS

(75) Inventors: Liang Tang, Vancouver, WA (US); Akinori Hashimura, Vancouver, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 545 days.

(21) Appl. No.: 12/621,567

(22) Filed: Nov. 19, 2009

(65) Prior Publication Data
US 2011/0109845 A1   May 12, 2011

Related U.S. Application Data

(63) Continuation-in-part of application No. 12/614,368, filed on Nov. 6, 2009, now Pat. No. 8,045,107.

(51) Int. Cl.
*G02F 1/1333* (2006.01)
(52) U.S. Cl. ........... 349/88; 349/106; 349/166; 359/296
(58) Field of Classification Search ............... None
See application file for complete search history.

(56) References Cited

U.S. PATENT DOCUMENTS

| 6,323,989 B1 * | 11/2001 | Jacobson et al. | 359/296 |
| 2007/0236768 A1 * | 10/2007 | Kawahara et al. | 359/237 |
| 2009/0034055 A1 | 2/2009 | Gibson | |

OTHER PUBLICATIONS

Heinz Raether, "Surface piasmons on smooth and rough surfaces and on gratings", Springer-Verlag, 1986.
J. Küpfer, H. Finkelmann "Nematic liquid single crystal elastomers", Makromol. Chem., Rapid Commun. 12, 717 (1991).
Shigehiro Hashimoto et al., Multifunctional liquid crystal elastomers: Large electromechanical and electro-optical effects, Applied Physics Letters, Vo.

* cited by examiner

*Primary Examiner* — Richard Kim
(74) *Attorney, Agent, or Firm* — Law Office of Gerald Maliszewski; Gerald Maliszewski (57) ABSTRACT

A plasmonic display device is provided having dual modulation mechanisms. The device has an electrically conductive bottom electrode that may be either transparent or reflective. A dielectric layer overlies the bottom electrode, made from an elastic polymer material having a refractive index responsive to an electric field. An electrically conductive top electrode, either transparent or reflective, overlies the dielectric layer. A plasmonic layer, including a plurality of discrete plasmonic particles, is interposed between the top and bottom electrodes and in contact with the dielectric layer. In one aspect, the plasmonic layer is embedded in the dielectric layer. Alternately, the plasmonic layer overlies the bottom (or top) electrode. Then, the dielectric layer overlies the plasmonic layer particles and exposed regions of the bottom electrode between the first plasmonic layer particles.

14 Claims, 7 Drawing Sheets

Fig. 1
*(PENDING ART)*

FIRST FIELD

Fig. 8B

SECOND FIELD

Fig. 9A

FIRST FIELD

Fig. 9B

SECOND FIELD

Fig. 10

POLYMER BACKBONE

CROSS-LINKER

LIQUID CRYSTAL UNIT

PLASMONIC DEVICE TUNED USING ELASTIC AND REFRACTIVE MODULATION MECHANISMS

RELATED APPLICATION

The application is a Continuation-in-Part of a application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009 now U.S. Pat No. 8,045,107, and is incorporated herein by reference.

BACKGROUND OF THE INVENTION

1. Field of the Invention

This invention generally relates to electronic visual display devices and, more particularly, to a color-tunable plasmonic display device that relies upon an elastic refractive index layer that can be electrically modulated.

2. Description of the Related Art

Reflective display or color-tunable device technology is attractive primarily because it consumes substantially less power than liquid crystal displays (LCDs) and organic light emitting diode (OLED) displays. A typical LCD used in a laptop or cellular phone requires internal (backlight) illumination to render a color image. In most operating conditions the internal illumination that is required by these displays is in constant competition with the ambient light of the surrounding environment (e.g., sunlight or indoor overhead lighting). Thus, the available light energy provided by these surroundings is wasted, and in fact, the operation of these displays requires additional power to overcome this ambient light. In contrast, reflective display technology makes good use of the ambient light and consumes substantially less power.

A number of different reflective display technologies have been developed, such as electrophoretic, electrowetting, electrochromic displays, and interference-based MEMS display. These display technologies all have disadvantages or challenges that must be overcome to obtain greater commercial success. Many existing technologies rely upon phenomena that are intrinsically slow. For example, electrophoretic or electrochemical techniques typically require particles to drift or diffuse through liquids over distances that create a slow response. Some other technologies require high power to operate at video rates. For example, many reflective displays must switch a large volume of material or chromophores from one state to another to produce an adequate change in the optical properties of a pixel. At video switching rates, currents on the order of hundreds of $mA/cm^2$ are necessary if a unit charge must be delivered to each dye molecule to affect the change. Therefore, display techniques that rely on reactions to switch dye molecules demand unacceptably high currents for displaying video. The same holds true for electrochromic displays.

A second challenge for reflective displays is the achievement of high quality color. In particular, most reflective display technologies can only produce binary color (color/black) from one material set. Because of this, at least three sub-pixels using different material sets must be used when employing a side-by-side sub-pixel architecture with fixed colors. This limits the maximum reflected light for some colors to about $1/3$, so that the pixels of this type cannot produce saturated colors with a good contrast.

Some reflective displays face reliability problem over a long lifetime. In particular, to sustain video rate operation for a few years requires at least billions of reversible changes in optical properties. Achieving the desired number of cycles is particularly difficult in reflective displays using techniques based on chemical reactions, techniques that involve mixing and separation of particles, or MEMS technology that involves repeated mechanic wear or electric stress.

Figure 1:
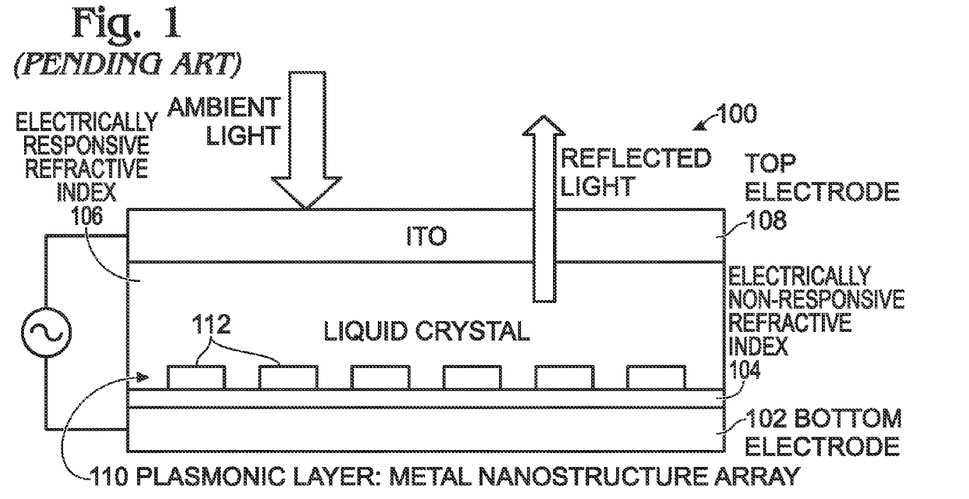
FIG. 1 is a partial cross-sectional view of nanoplasmonic display in which the color tuning is accomplished by electrical modulation of the refractive index of an electro-optical material such as a liquid crystal (pending art).

FIG. 1 is a partial cross-sectional view of nanoplasmonic display in which the color tuning is accomplished by electrical modulation of the refractive index of an electro-optical material such as a liquid crystal (pending art). Details of the device 100 can be found in the pending application entitled, COLOR-TUNABLE PLASMONIC DEVICE WITH A PARTIALLY MODULATED REFRACTIVE INDEX, invented by Tang et al., Ser. No. 12/614,368. Because of the limited refractive index (n) change of dielectric 106 materials such as liquid crystal, the color tuning range of a device using just this tuning modulation means is very, limited. Thus, the device of FIG. 1 uses an additional color tuning mechanism, as described below.

Figure 2:
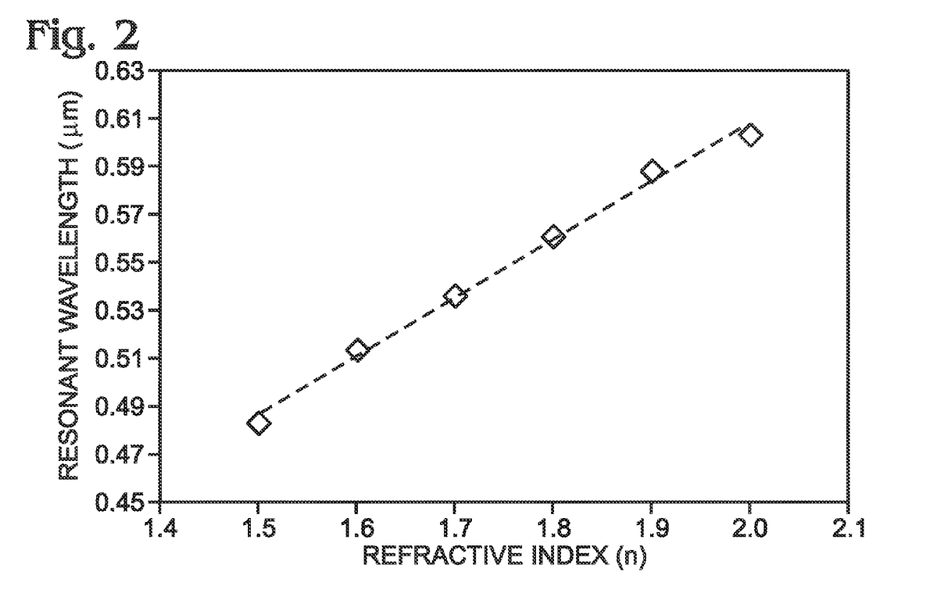
FIG. 2 is a graph simulating the relationship between resonant wavelength change and refractive index for a liquid crystal material surrounding an Ag nanoparticle with a diameter of 80 nanometers.

FIG. 2 is a graph simulating the relationship between resonant wavelength change and refractive index for a liquid crystal material surrounding an Ag nanoparticle with a diameter of 80 nanometers. For example, the highest birefringence liquid crystal commercially available only has a $\Delta n$ of 0.3, which provides a tuning range of only 80 nm, based on the simulation result in FIG. 2. Research labs have reported liquid crystals with a $\Delta n$ as high as 0.79, but the performance of such materials is not guaranteed. Besides, these materials may not have the appropriate response time or threshold voltage required for the nanoplasmonic display application.

Returning to FIG. 1, the color tuning range of a plasmonic device can be improved with the addition of a second dielectric layer 104, which has a refractive index that is non-responsive to an electric field.

It would be advantageous if further improvements in the color range of a plasmonic device could be obtained by an additional mechanism, other than changing the refractive index of the dielectric materials.

SUMMARY OF THE INVENTION

The full range of colors produced by plasmon resonances resulting from metal nanostructures has been known since ancient times as a means of producing stained colored glass. For instance, the addition of gold nanoparticles to otherwise transparent glass produces a deep red color. The creation of a particular color is possible because the plasmon resonant frequency is generally dependent upon the size, shape, material composition of the metal nanostructure, as well as the dielectric properties of the surroundings environment. Thus, the optical absorption and scattering spectra (and therefore the color) of a metal nanostructure can be varied by altering any one or more of these characteristics.

Described herein is a method for the electrical tuning of the refractive index of the surrounding dielectric material. By making use of the tunable refractive index of liquid crystal or other electro-optical materials, the plasmonic resonance of the metal nanostructures can be tuned across the visible range and, thus, a pixel can exhibit different colors under different external voltages. Liquid crystal (LC), for example, has an electrically tunable refractive index. LC has a response time of a few milliseconds or shorter and, therefore, is fast enough for video applications.

To further enhance the color tuning range of a nanoplasmonic display, a hybrid material may be used—a liquid crystal/polymer hybrid. An LC-polymer hybrid has two sets of favorable characteristics: LC electro-optical properties and the elasticity of a polymer. In this hybrid film, the re-orientation of the molecules with an applied electrical field leads to both a refractive index change and the expansion/contraction of the film.

The plasmon resonance of metal nanostructures depends not only upon the refractive index of the surrounding medium, but also on the distance between nanoparticles. Therefore, the wavelength tuning range can be increased substantially when the refractive index modulation is combined with elastic actuation. Thus, large electromechanical and electro-optical effects can be achieved simultaneously with a low driving voltage. The color-tunable device operates with ambient light and does not normally require backlight illumination. Since ambient illumination is used to render these images, the power requirements of such a display are dramatically less than a standard LCD and, therefore, reduce the power consumption when introduced into devices such as a cellular phone or laptop.

Accordingly, a plasmonic display device is provided having dual modulation mechanisms. The device has an electrically conductive bottom electrode that may be either transparent or reflective. A dielectric layer overlies the bottom electrode, made from an elastic polymer material having a refractive index responsive to an electric field. An electrically conductive top electrode, either transparent or reflective, overlies the dielectric layer. A plasmonic layer, including a plurality of discrete plasmonic particles, is interposed between the top and bottom electrodes and in contact with the dielectric layer. In one aspect, the plasmonic layer is embedded in the dielectric layer. Alternately, the plasmonic layer overlies the bottom (or top) electrode. Then, the dielectric layer overlies the plasmonic layer particles and exposed regions of the bottom electrode between the first plasmonic layer particles.

The plasmonic particles in the plasmonic layer may be arranged in either a random order or a symmetrical array. The plasmonic particles may be of a uniform size or the plasmonic layer may be comprised of a plurality of particle sizes. Likewise, the particles may have a uniform shape (structure) or a plurality of different particle structures. Due to the elastic nature of the dielectric, the plasmonic particles have a first average spacing between particles in response to a first electric field between the top and bottom electrodes, and a second average spacing between particles in response to a second electric field.

Additional details of the above-described plasmonic display device, as well as a method for creating colors in the visible spectrum using a tunable plasmonic device with dual modulation mechanisms, are provided below.

DETAILED DESCRIPTION

Figure 3:
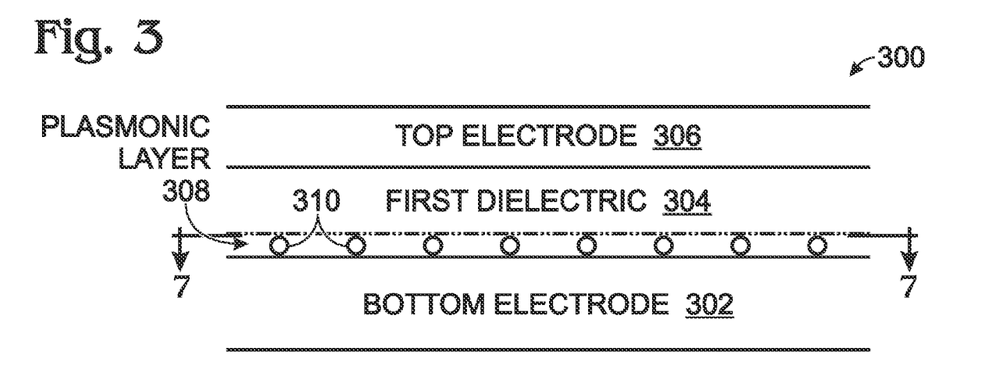
FIG. 3 is a partial cross-sectional view of a plasmonic display device with dual modulation mechanisms.

FIG. 3 is a partial cross-sectional view of a plasmonic display device with dual modulation mechanisms. The device 300 comprises an electrically conductive bottom electrode 302. A first dielectric layer 304 overlies the bottom electrode 302. The first dielectric layer 304 is made from an elastic polymer material having a refractive index responsive to an electric field. An electrically conductive top electrode 306 overlies the first dielectric layer. A first plasmonic layer 308, including a plurality of discrete plasmonic particles 310, is interposed between the top electrode 306 and the bottom electrode 302, and in contact with the first dielectric layer 304. In one aspect as shown, the first plasmonic layer 308 is embedded in the first dielectric layer 304.

In one aspect, both the top electrode 306 and the bottom electrode 302 are transparent to a first range of wavelengths in the visible spectrum of light, made from a material such as indium tin oxide (ITO) or ZnO. In that case, the device 300 is transmissive—accepting ambient (white) light and passing a tuned color. Since the metal nanoparticles reflect light, the device may be considered both transmissive and reflective. That is, the device reflects a tuned color and passes another tuned color. Alternately, one of the two electrodes made be made from an optically reflective (opaque) material, such as Al, Ti, or Cu. In that case, the device is reflective.

The first dielectric 304 may be a material such as liquid crystal elastomer or polymer-networked liquid crystal. However, this is not an exhaustive list of all possible materials and it should be understood that other elastic materials may be used that have a refractive index responsive to an electric field. The change in refractive index is dependent upon a number of variables including applied voltage and material thicknesses. Generally however, the first dielectric 304 has a refractive index that varies between 1.0 and 3, in any direction, in response to an electric field. Since refractive index is direction-dependent, the refractive index value may be defined as the "effective" value or "average" value, as well as the individual component value (along a particular direction).

Figure 4:
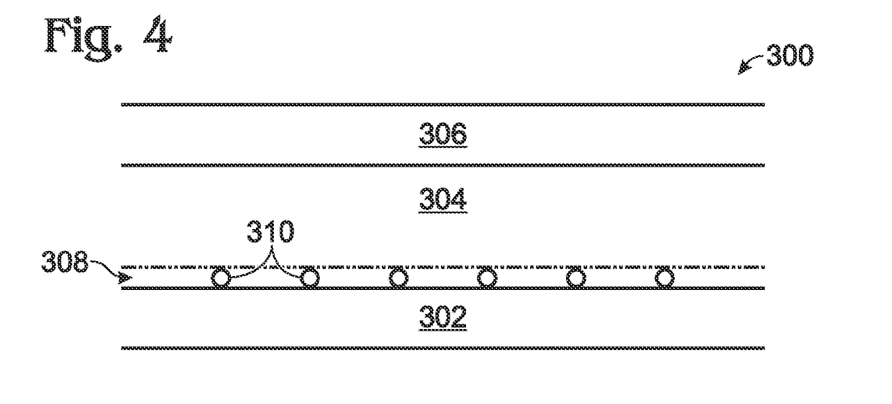
FIG. 4 is a partial cross-sectional view of a variation of the plasmonic display device of FIG. 3.

FIG. 4 is a partial cross-sectional view of a variation of the plasmonic display device of FIG. 3. In this aspect the first plasmonic layer 308 overlies the bottom electrode 302. The first dielectric layer 304 overlies the first plasmonic layer particles 310 and exposed regions of the bottom electrode 302 between the first plasmonic layer particles 310.

Figure 5:
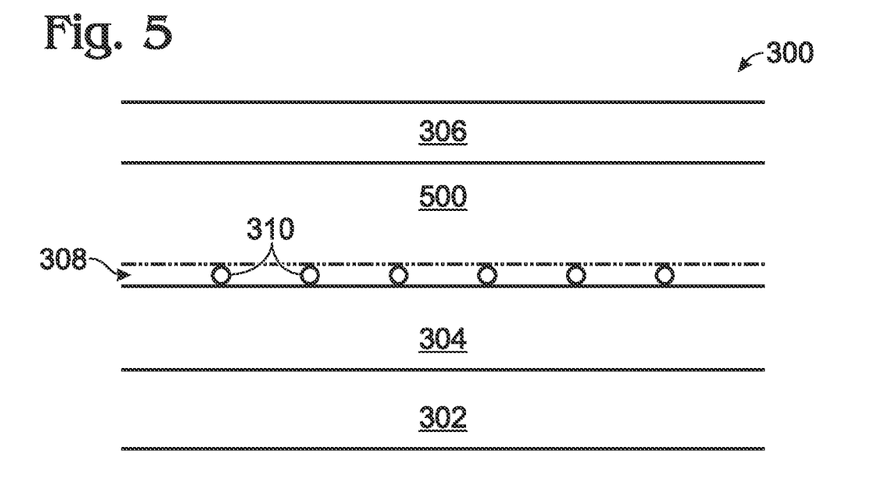
FIG. 5 is a partial cross-sectional view of a variation of the plasmonic display device of FIG. 4.

FIG. 5 is a partial cross-sectional view of a variation of the plasmonic display device of FIG. 4. In this aspect, a second dielectric layer 500 overlies the first dielectric layer 304. The second dielectric layer 500 has a refractive index non-responsive to an electric field. The second dielectric 500 may be a material such as SiOx, SiNx, SiOxNy, MgF2, CaF2, SiOC, amorphous fluoropolymers, or organic polymers. However, this is not an exhaustive list of materials. It should be understood that although only a two dielectric layer structure is shown, the same principles can be applied to create devices with additional dielectric layers. In this aspect, the plasmonic layer 308 is interposed between dielectric layers 304 and 500. Alternately but not shown, the plasmonic layer may be embedded in the first dielectric, as in FIG. 3, or interposed between the bottom electrode and first dielectric layer, as in FIG. 4.

Figure 6:
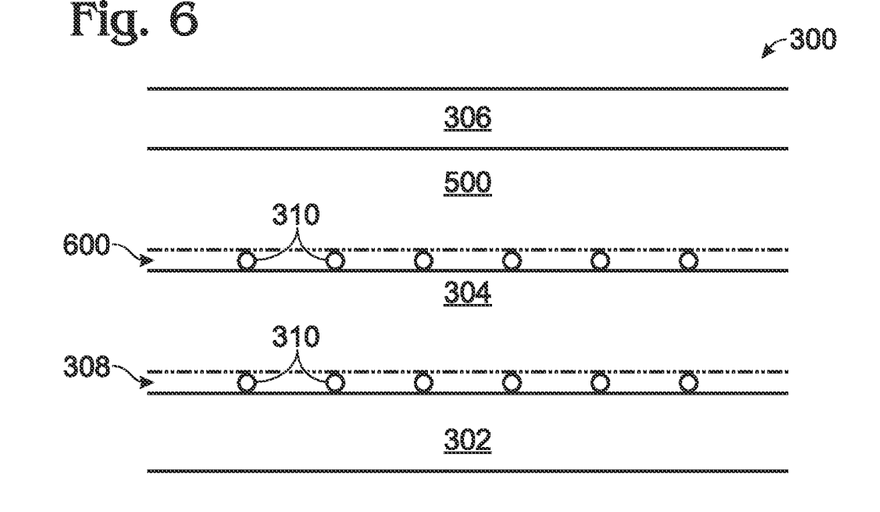
FIG. 6 is a partial cross-sectional view of a variation of the plasmonic display device of FIG. 5.

FIG. 6 is a partial cross-sectional view of a variation of the plasmonic display device of FIG. 5. In this aspect, a second plasmonic layer 600 of plasmonic particles 310 is interposed between the first dielectric layer 304 and the second dielectric layer 500. The first plasmonic layer 308 is interposed between the first dielectric layer 304 and the bottom electrode 302. Note: the particles in the two plasmonic layers may, or may not have the same sizing, spacing, and organization. Likewise, the particles need not be made from the same materials. In another aspect not shown, the second dielectric layer may be a material like the first dielectric, which is elastic and has an index of refraction responsive to an electric field. It should be understood that although only a two dielectric layer structure is shown, the same principles can be applied to create devices with additional dielectric layers. Alternately but not shown, the first plasmonic layer 308 may be embedded in the first dielectric, as in FIG. 3.

Figure 7:
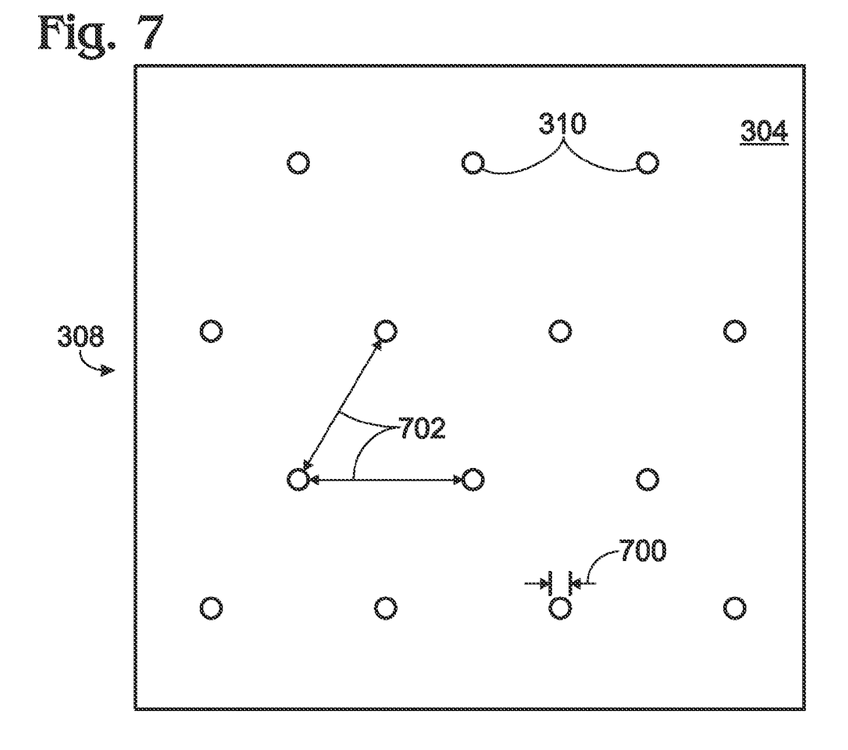
FIG. 7 is a plan view of the plasmonic layer of FIG. 3.

FIG. 7 is a plan view of the plasmonic layer of FIG. 3. The plasmonic particles 310 in the first plasmonic layer 308 (or of the second plasmonic layer 600) may be comprised of a uniform particle structure (shape) or a plurality of different particle structures. Some examples of particle structures include spherical, disk, composite shell, dome, egg, cup, rod, bar, pyramid, and star. Note: the composite shell structure may comprise a metal core surrounded by a dielectric shell, or a dielectric core surrounded by a metal shell. In one aspect, the composite shell dielectric may have a refractive index that varies in response to electric fields. Note: the device may be enabled using other structures, as an exhaustive collection of structures and shapes in not shown.

Likewise, the plasmonic particles 310 in the first plasmonic layer may have a uniform size (diameter) or comprise a plurality of different particle sizes. Typically, the plasmonic particles 310 have a size 700 in the range of 10 nanometers (nm) to 300 nm. Typically, the plasmonic particles 310 have an average spacing 702 between particles, which is in the range of about 700 nm, or less.

Further, the plasmonic particles 310 may be a random order or in a symmetrical array. A wide variety of two dimensional (2-D) and three dimensional array patterns are known in the art. Shown is a 2-D triangle pattern array, but the device is not limited to any particular type of array pattern. The plasmonic particles 310 in the first plasmonic layer may be made of the same material or a variety of different materials. Some examples of plasmonic particle materials include Ag, Au, Cu, Pt, Al, and alloys of the above-mentioned metals. Note: if two or more plasmonic layers are used, the different layers need not necessarily use the same plasmonic particles sizes, shapes, material, spacings, or ordering.

Figure 8A:
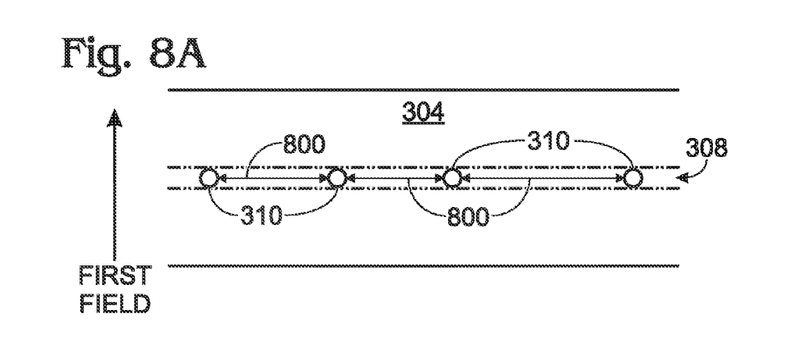
FIGS. 8A and 8B are partial cross-section views showing the plasmonic layer of FIG. 3 in greater detail, under the influence of different electric fields.
Figure 8B:
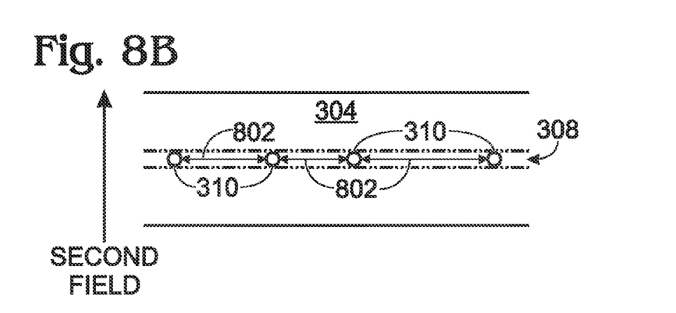

FIGS. 8A and 8B are partial cross-section views showing the plasmonic layer of FIG. 3 in greater detail, under the influence of different electric fields. In FIG. 8A, the plasmonic particles have a first average spacing 800 between particles 310 in response to a first electric field between the top and bottom electrodes (not shown). In a symmetrical array (not shown), the spacing may be a uniform value. In a random ordering of plasmonic particles, as shown, the spacing 800 between particles may be not uniform. In FIG. 8B there is a second average spacing 802 between particles 310 in response to a second electric field. As shown, the second average spacing 802 is less than the first average spacing. The difference between the two spacings contributes to the color tuning range of the device.

Alternately stated, the first dielectric material 304 has a first index of expansion in response to a first electric field between the top and bottom electrodes, and a second index of expansion in response to a second electric field. As used herein, the index of expansion is related to the elasticity of a material, and ultimately defines the average distance between particles in the first dielectric material. Since it is possible for the first dielectric material to contract with respect to a reference condition, the expansion index may be understood to be expressed with both positive and negative coefficients.

Figure 9A:
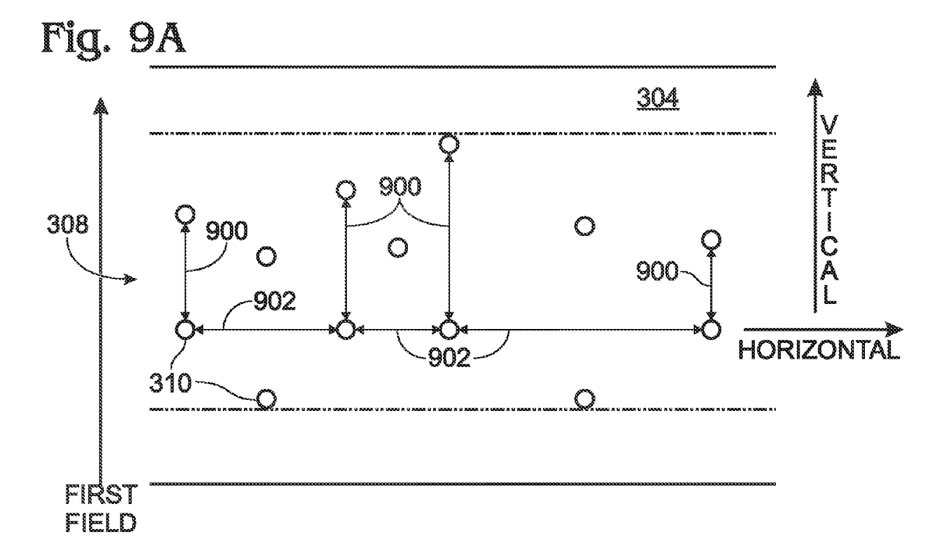
FIGS. 9A and 9B are partial cross-section views showing the influence of different electric fields on the different dimensions of the first dielectric material.
Figure 9B:
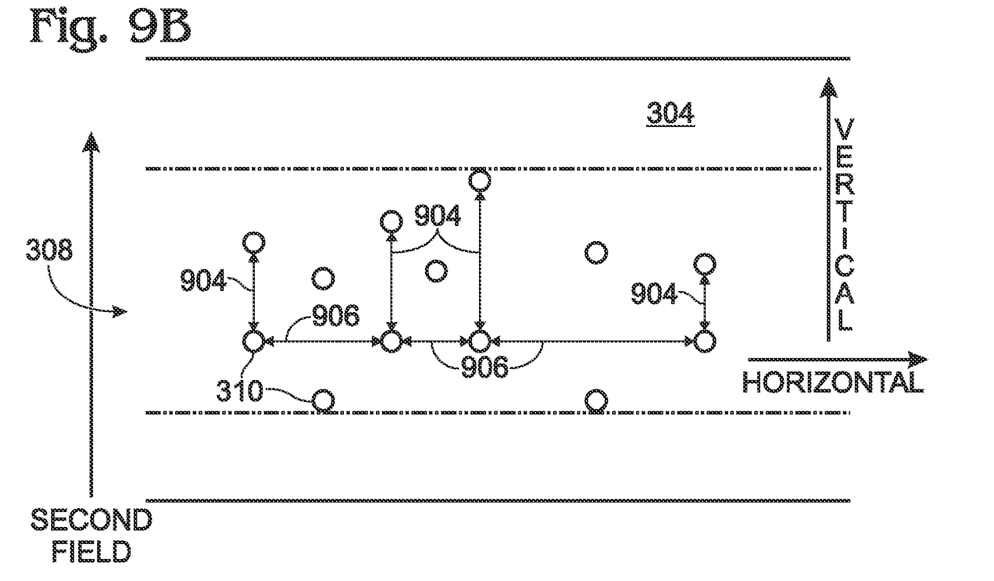

FIGS. 9A and 9B are partial cross-section views showing the influence of different electric fields on the different dimensions of the first dielectric material. In FIG. 9A, the first dielectric material has a first index of expansion in a vertical plane in response to a first electric field between the top and bottom electrodes (not shown) and a second index of expansion in a horizontal plane in response to the first electric field. Since it is difficult to depict, the index of expansion may be understood as being represented by a distance between particles 310. Thus, the particles 310 have a first spacing 900 in response to the first index of expansion, and a second spacing 902 in response to the second index of expansion.

In FIG. 9B, the first dielectric material 304 has a third index of expansion in the vertical plane in response to a second electric field, and a fourth index of expansion in the horizontal plane in response to the second electric field. Alternately expressed, the particles 310 have a third spacing 904 in response to the third index of expansion, and a fourth spacing 906 in response to the fourth index of expansion.

A number of different multilayer plasmonic devices may be formed by combining the device structures shown in FIGS. 3 through 6.

Functional Description

Plasmons, which are quantized oscillations of the free electron gas in a metal or other material, affect how light interacts with a structure and thereby determine the apparent color of the structure. This phenomenon generally occurs through the coupling of surface plasmons with light, to form surface plasmon-polaritons. Tuning the color of metal nanostructures is possible because the plasmon resonant frequency of such structures generally depends on the size, shape, distance between plasmonic particles, and the dielectric properties of the surrounding material. Thus, the optical absorption and scattering spectra (and therefore the color) of metal structures can be varied by altering any one or more of these characteristics.

Figure 10:
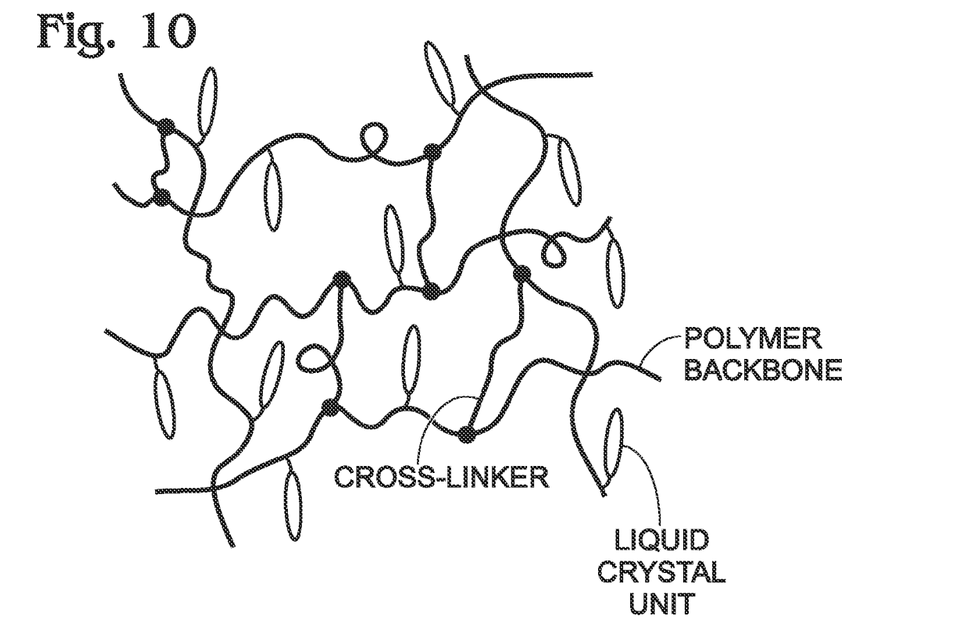
FIG. 10 is a schematic diagram of a liquid crystal—polymer network.

FIG. 10 is a schematic diagram of a liquid crystal—polymer network. The plasmonic devices of FIGS. 3-6 use a hybrid material, e.g., a liquid crystal/polymer hybrid, to increase the color tuning range of the nanoplasmonic display. Liquid crystals are known to change phase and orientation under the influence of applied electric field. By incorporating such mesogens into a compliant polymer backbone or as side chains, field induced changes in phase can be used to produce actuation.

Liquid crystals inhabit the grey area between liquids and solids. They have long range orientational order, typically of the unique axes of their component rod-like or plate molecules. Spatial variations of this average direction of molecular orientation are resisted by a property recognized as Frank elasticity. On the other hand, liquid crystals can flow, as anisotropic liquids.

For polymers above the glass transition, the physics is mostly dominated by the high entropy inherent in the disorder of their component long chain molecules. Resistance to molecular shape change arises mostly from the imperative to maintain high entropy. Viscoelastic flow and rubber elasticity are macroscopic manifestations of this principle. Thus rubber, where the long molecules are linked together, also inhabits the grey region between liquids and solids. Though nominally a solid, rubber is capable of very high deformations, greater than any other type of solid. Its internal molecular motion is rapid, as in a liquid, with the resulting amorphous solid being highly extensible rather than glassy. If it were not for the few cross-links holding the chains into a percolating network, rubber would flow under stress, as ordinary polymers and other liquids do. Thus, rubber essentially deforms as a liquid, which is by shearing at constant volume.

An LC-Polymer hybrid has the electro-optical properties of liquid crystal and the elasticity of a polymer. In this hybrid film, the re-orientation of the molecules with an applied electrical field leads to both a refractive index change and the expansion/contraction of the film. The novel material exhibits many entirely new effects that are not simply enhancements of native liquid crystals or polymers. For example, the thermal phase transformations giving rise to spontaneous shape changes of many hundreds of percents. Further, transitions and instabilities are induced by applied mechanical stress or strain, and some unusual dynamical effects occur. Strangest of all, elastomers under some conditions behave entirely soft, deforming as true liquids do without the application of stress. All these new forms of elasticity have their genesis in the ambiguities between liquid and solid that are present in liquid crystals and polymers, but are only brought to light in a cross-linked rubbery network.

The plasmon resonance of metal nanostructures depends not only on the refractive index of the surrounding medium, but also on the distance between nanoparticles. Therefore, the wavelength tuning range can be increased substantially when the refractive index modulation is combined with elastic actuation. Large electromechanical and electro-optical effects can be achieved simultaneously with a low driving voltage. In one aspect, about a 20% length change is achieved with less than 10V driving voltage.

Figure 11A:
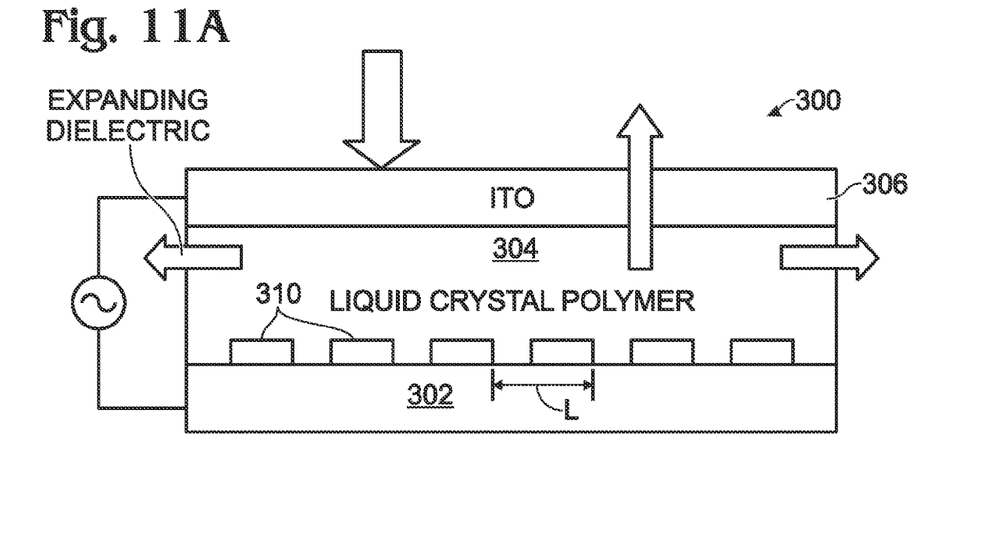
FIGS. 11A and 11B are, respectively, a partial cross-sectional view of a dual modulation plasmonic device and a graph illustrating the relationship between particle pitch and wavelength.
Figure 11B:
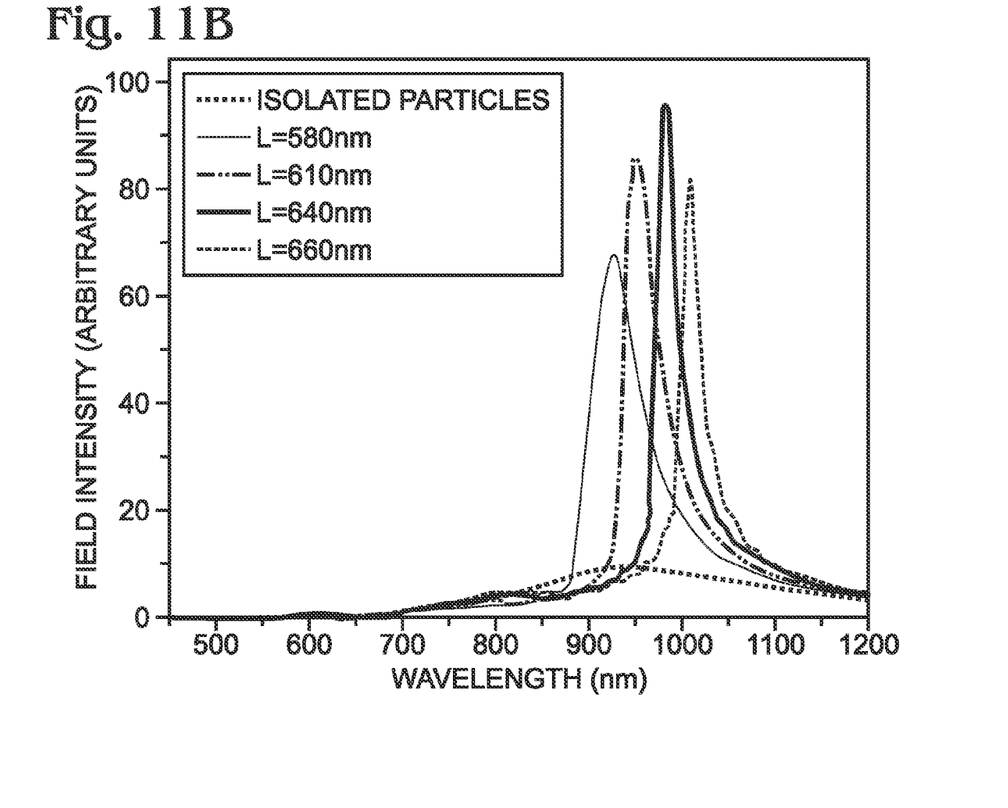

FIGS. 11A and 11B are, respectively, a partial cross-sectional view of a dual modulation plasmonic device and a graph illustrating the relationship between particle pitch and wavelength. If the nanoparticles are arranged in a 2D square lattice, the reflection resonances depend strongly on the pitch (particle spacing) of the array. The resonance originates from the collective interference of single nanoparticle resonances. Shown in FIG. 11B is a graph based upon Finite Difference Time Domain (FDTD) calculations for a 2D array of Au nano-disks. In the simulation, the refractive index of the surrounding medium is fixed. Based on the figure, when the pitch changes from 580 nm to 640 nm, the resonant wavelength shifts from 920 nm to 980 nm. This means that 10% change in the pitch results in an additional wavelength shift of 60 nm. If the original wavelength shift due to tuning the refractive index is about 80 nm, then the total wavelength tuning range increases to 140 nm.

Figure 12:
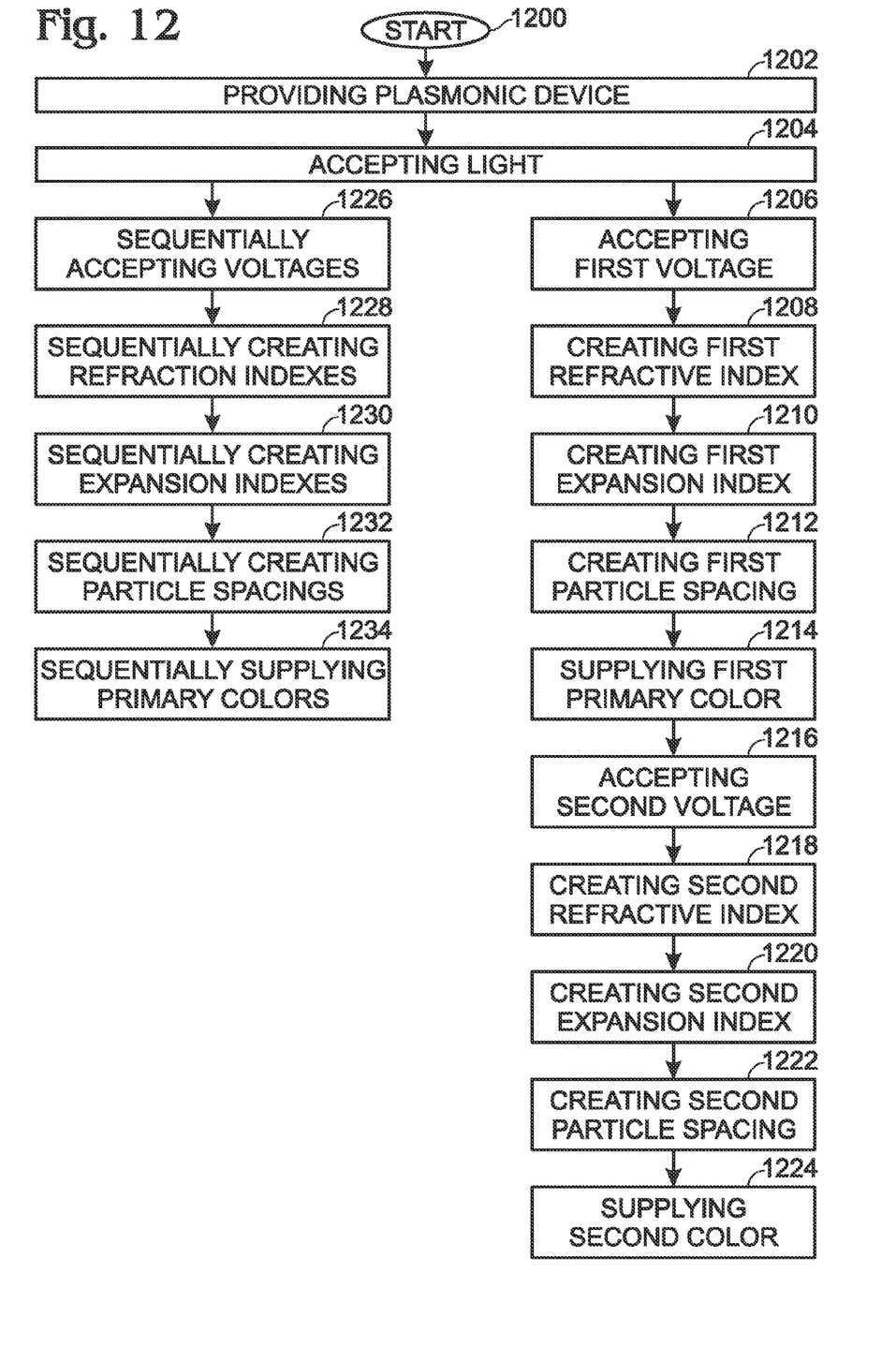
FIG. 12 is a flowchart illustrating a method for creating colors in the visible spectrum using a plasmonic display device with dual modulation mechanisms.

FIG. 12 is a flowchart illustrating a method for creating colors in the visible spectrum using a plasmonic display device with dual modulation mechanisms. Although the method is depicted as a sequence of numbered steps for clarity, the numbering does not necessarily dictate the order of the steps. It should be understood that in some aspects of the method these steps may be skipped, performed in parallel, or performed without the requirement of maintaining a strict order of sequence. Generally however, the steps are performed in the numeric order. The method starts at Step 1200.

Step 1202 provides a plasmonic device with an electrically conductive bottom electrode, a first dielectric layer overlying the bottom electrode, made from an elastic polymer and having a refractive index responsive to an electric field, and an electrically conductive top electrode overlying the second dielectric layer. A first plasmonic layer, including a plurality of discrete plasmonic particles, is interposed between the top and bottom electrodes, and is in contact with the first dielectric layer (see FIGS. 3-6). Step 1204 accepts a full-spectrum visible light incident to the top electrode. Step 1206 accepts a first voltage potential between the top and bottom electrodes, generating a first electric field. Step 1208 creates a first refractive index in the first dielectric layer in response to the first electric field. Step 1210 creates a first index of expansion in the first dielectric layer in response to the first electric field. In response to the first index of expansion, Step 1212 creates a first average spacing between particles in the first plasmonic layer. Step 1214 supplies a first primary color in response to the first refractive index and the first average spacing, where a primary color exhibits a single wavelength peak with a spectral full width at half magnitudes (FWHMs) in the visible spectrum of light.

In one aspect, Step 1216 accepts a second voltage potential between the top and bottom electrodes, different from the first voltage potential, and generates a second electric field different from the first electric field. Step 1218 creates a second refractive index in the first dielectric layer in response to the second electric field. Step 1220 creates a second index of expansion in the first dielectric layer in response to the second electric field. In response to the second index of expansion, Step 1222 creates a second average spacing between particles in the first plasmonic layer. Step 1224 supplies a second primary color in response to second refractive index and second average spacing.

In another aspect, Step 1226 sequentially accepts a first plurality of voltage potentials between the top and bottom electrodes, sequentially generating a first plurality of electric fields. Step 1228 sequentially creates a first plurality of refractive indexes in the first dielectric layer in response to the first plurality of electric fields. Step 1230 sequentially creates a first plurality of expansion indexes in the first dielectric layer in response to the first plurality of electric fields. In response to the first plurality of expansion indexes, Step 1232 sequentially creates a first plurality of average spacings between particles in the first plasmonic layer. Step 1234 sequentially supplies a first plurality of primary colors in response to the first plurality of refractive index and corresponding average spacings.

In one aspect, creating the first index of expansion in the first dielectric layer (Step 1210) includes creating a first vertical index of expansion and a first horizontal index of expansion. Then, creating the first average spacing in Step 1212 includes creating a first average vertical spacing between plasmonic particles in response to the first vertical index of expansion and a first average horizontal spacing in response to the first horizontal index of expansion. Step 1214 supplies the first primary color in response to the first refractive index, the first average vertical spacing, and the first average horizontal spacing.

A color-tunable plasmonic device with dual modulation mechanism is provided, along with an associated tuning method. Examples of specific materials and structures have been used to illustrate the invention. However, the invention is not limited to merely these examples. Other variations and embodiments of the invention will occur to those skilled in the art.

We claim:

1. A plasmonic display device with dual modulation mechanisms, the device comprising:
   an electrically conductive bottom electrode;
   a first dielectric layer overlying the bottom electrode, made from an elastic polymer material having a refractive index responsive to an electric field;
   an electrically conductive top electrode overlying the first dielectric layer; and,
   a first plasmonic layer including a plurality of discrete plasmonic particles, interposed between the top and bottom electrodes and in contact with the first dielectric layer.

2. The device of claim 1 wherein the first plasmonic layer overlies the bottom electrode; and,
   wherein the first dielectric layer overlies the first plasmonic layer particles and exposed regions of the bottom electrode between the first plasmonic layer particles.

3. The device of claim 1 wherein the bottom electrode is transparent to a first range of wavelengths in the visible spectrum of light; and,
   wherein the top electrode is transparent to the first range of light wavelengths.

4. The device of claim 1 wherein the plasmonic particles in the first plasmonic layer are arranged in an order selected from a group consisting of random and a symmetrical array.

5. The device of claim 1 wherein the plasmonic particles have a first average spacing between particles in response to a first electric field between the top and bottom electrodes, and a second average spacing between particles in response to a second electric field.

6. The device of claim 1 wherein the plasmonic particles in the first plasmonic layer comprise a plurality of different particle structures.

7. The device of claim 1 wherein the plasmonic particles in the first plasmonic layer comprise a plurality of different particle sizes.

8. The device of claim 1 wherein the plasmonic particles in the first plasmonic layer are a material selected from a group consisting of Ag, Au, Cu, Pt, Al, and alloys of the above-mentioned metals.

9. The device of claim 1 wherein the plasmonic particles in the first plasmonic layer have a size in a range of 10 nanometers (nm) to 300 nm.

10. The device of claim 1 wherein the first dielectric is a material selected from a group consisting of liquid crystal elastomer and polymer-networked liquid crystal.

11. The device of claim 1 wherein the first dielectric material has a first index of expansion in response to a first electric field between the top and bottom electrodes, and a second index of expansion in response to a second electric field.

12. The device of claim 1 wherein the first dielectric material has a first index of expansion in a vertical plane in response to a first electric field between the top and bottom electrodes and a second index of expansion in a horizontal plane in response to the first electric field; and,
    wherein the first dielectric material has a third index of expansion in the vertical plane in response to a second electric field, and a fourth index of expansion in the horizontal plane in response to the second electric field.

13. The device of claim 1 wherein the first dielectric has a refractive index that varies between 1.0 and 3, in any direction, in response to an electric field.

14. The device of claim 1 wherein an electrode selected from a group consisting of the top electrode and the bottom electrode is optically reflective to a first range of wavelengths in the visible spectrum of light; and,
    wherein the unselected electrode is transparent to the first range of light wavelengths.

* * * * *